United States Patent [19]

Shibahata

[11] Patent Number: 4,984,482

[45] Date of Patent: Jan. 15, 1991

[54] DRIVE POWER TRANSMISSION MECHANISM FOR MOTOR VEHICLES

[75] Inventor: Yasuji Shibahata, Tochigi, Japan

[73] Assignee: Honda Giken Kogyo Kabushiki Kaisha, Tokyo, Japan

[21] Appl. No.: 376,061

[22] Filed: Jul. 6, 1989

[30] Foreign Application Priority Data

Jul. 8, 1988 [JP] Japan .............................. 63-90641[U]

[51] Int. Cl.$^5$ ............................................ F16H 35/04
[52] U.S. Cl. ..................................... 74/650; 74/665 T
[58] Field of Search ... 74/665 GA, 665 GB, 665 GC, 74/650, 665 H, 745, 665 Q, 665 L, 665 P, 665 T; 475/27; 180/76

[56] References Cited

U.S. PATENT DOCUMENTS

| 2,286,575 | 6/1942 | Ronning | 180/76 |
|---|---|---|---|
| 2,389,498 | 11/1945 | Gates | 475/27 |
| 3,400,777 | 9/1968 | Hill | 74/665 T |
| 4,117,744 | 10/1978 | Butculescu | 74/665 T |
| 4,184,387 | 1/1980 | Kiritani et al. | 74/665 T |
| 4,681,180 | 7/1987 | Oyama et al. | 180/76 |
| 4,721,010 | 1/1988 | Sheldon et al. | 74/650 |

FOREIGN PATENT DOCUMENTS

| 0026029 | 3/1978 | Japan | 180/76 |
|---|---|---|---|
| 0071481 | 3/1988 | Japan | 180/76 |
| 0369973 | 7/1963 | Switzerland | 180/76 |

*Primary Examiner*—Dirk Wright
*Attorney, Agent, or Firm*—Armstrong, Nikaido, Marmelstein, Kubovcik and Murray

[57] ABSTRACT

A drive power transmission mechanism in a motor vehicle having a drive power source includes a propeller shaft having a front end coupled to the drive power source, an intermediate shaft extending transversely to the propeller shaft and operatively coupled to a rear end of the propeller shaft through a bevel gear mechanism, and a final speed reducer operatively coupled to the intermediate shaft through spur gears. The bevel gear mechanism comprises a first bevel gear fixed coaxially to the rear end of the propeller shaft and a second bevel gear fixedly mounted coaxially on the intermediate shaft and meshing with the first bevel gear at a predetermined gear ratio.

6 Claims, 1 Drawing Sheet

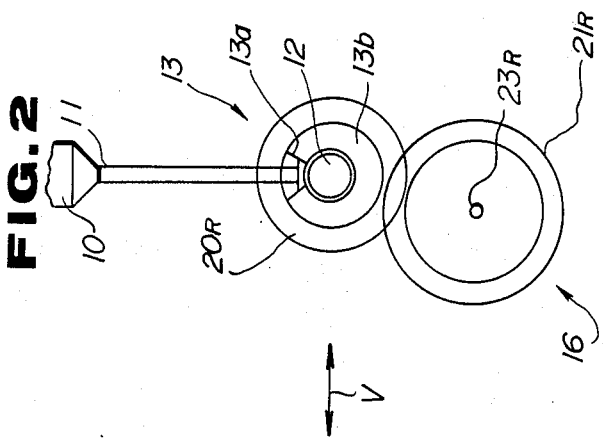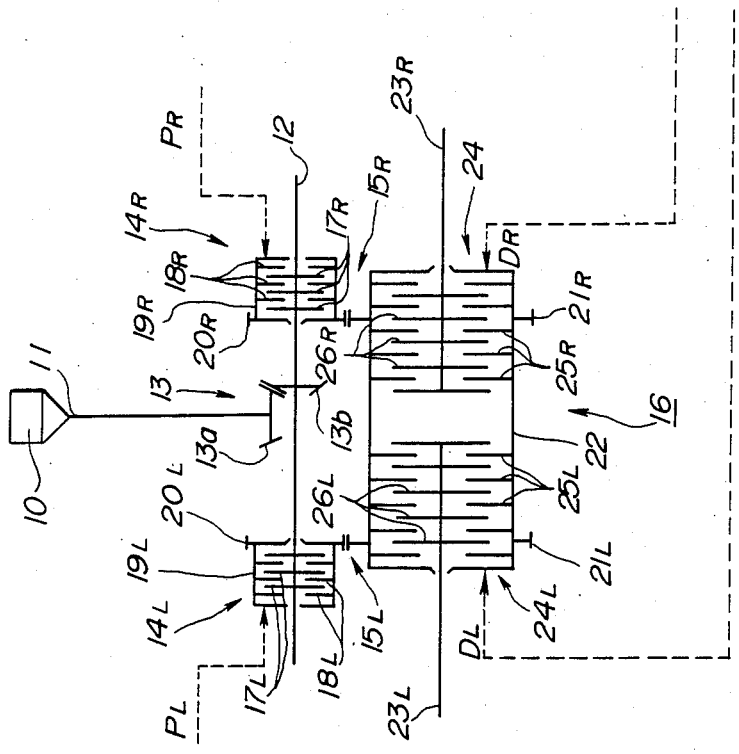

DRIVE POWER TRANSMISSION MECHANISM FOR MOTOR VEHICLES

BACKGROUND OF THE INVENTION

1. Field of the Invention

The present invention relates to a drive power transmission mechanism for a motor vehicle, and more particularly to a drive power transmission mechanism for transmitting the drive power from a motor vehicle engine through a propeller shaft and a final speed reducer to drive road wheels.

2. Description of the Relevant Art

There are known motor vehicles in which the drive power from the engine is transmitted to drive road wheels through a drive power transmission mechanism that comprises a propeller shaft and a final speed reducer. The final speed reducer incorporates therein a limited-slip differential or a transmission for improving running performance, particularly turning performance, of the motor vehicle.

In the drive power transmission mechanism, the propeller shaft and the final speed reducer are operatively coupled to each other by bevel gears fixed respectively to the propeller shaft and the final speed reducer. The propeller shaft is subjected to positional limitations because the bottom of the motor vehicle body is required to have a certain minimum height from the ground and the propeller shaft must not interfere with a fuel tank and other components. For this reason, the axes of the bevel gears on the propeller shaft and the final speed reducer cannot be held on one plane, i.e., in alignment with each other. These bevel gears have heretofore been in the form of hyperboloidal gears such as hypoid gears meshing with each other.

Since the hyperboloidal gears are expensive, the drive power transmission mechanism is costly to manufacture. The hyperboloidal gears need a complex sealing structure since they require special highly viscous lubricating oil different from the lubricating oil contained in the final speed reducer.

SUMMARY OF THE INVENTION

In view of the aforesaid problems of the conventional drive power transmission mechanism, it is an object of the present invention to provide a drive power transmission mechanism for motor vehicles which can transmit the drive power from a propeller shaft through ordinary bevel gears rather than hyperboloidal gears such as hypoid gears to a final speed reducer or drive road wheel axles.

According to the present invention, there is provided a drive power transmission mechanism in a motor vehicle having a drive power source, comprising a propeller shaft having a front end coupled to the drive power source, a bevel gear mechanism, an intermediate shaft extending transversely to the propeller shaft and operatively coupled to a rear end of the propeller shaft through the bevel gear mechanism, spur gear means, and a final speed reducer operatively coupled to the intermediate shaft through the spur gear means. The bevel gear means comprises at least one spur gear mechanism including a first bevel gear fixed coaxially to the rear end of the propeller shaft and a second bevel gear fixedly mounted coaxially on the intermediate shaft and meshing with the first bevel gear at a predetermined gear ratio.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 1 is a schematic plan view of a drive power transmission mechanism according to an embodiment of the present invention; and FIG. 2 is a schematic side elevational view of the drive power transmission mechanism shown in FIG. 1.

DETAILED DESCRIPTION OF THE PREFERRED EMBODIMENT

As shown in FIG. 1, a drive power transmission mechanism for a motor vehicle according to the present invention includes a propeller shaft 11 having a front end coupled to a transmission 10 and extending rearwardly therefrom in a longitudinal direction of the motor vehicle. The propeller shaft 11 has a rear end operatively coupled through a bevel gear mechanism 13 to an intermediate shaft 12 that extends in the same plane as that in which the propeller shaft 11 lies and that extends laterally toward each side in the transverse direction of the motor vehicle. The bevel gear mechanism 13 comprises a bevel gear 13a fixed to the rear end of the propeller shaft 11 and a bevel gear 13b fixed to a substantially central portion of the intermediate shaft 12. The bevel gear mechanism 13 therefore interconnects the propeller shaft 11 and the intermediate shaft 12 in power transmitting relation. As shown in FIG. 2, the bevel gears 13a, 13b are coaxial with the propeller shaft 11 and the intermediate shaft 12, respectively, and have their axes intersecting perpendicularly in the plane in which the propeller shaft 11 lies.

The intermediate shaft 12 is operatively coupled to a differential 16 through hydraulically operated multidisc clutches 14L, 14R mounted in series relation on left and right portions of the intermediate shaft 12 and also through spur gear mechanisms 15L, 15R, with the bevel gear 13b located between the multidisc clutches 14L, 14R. The differential 16 has a pair of opposite coaxial output shafts 23L, 23R to which respective drive road wheels (not shown) of the motor vehicle are connected, the output shafts 23L, 23R extending parallel to the intermediate shaft 12.

The clutches 14L, 14R comprise respective drums 19L, 19R coaxial with the intermediate shaft 12, respective sets of inner plates 17L, 17R positioned within the drums 19L, 19R, respectively, and splined to the intermediate shaft 12 for rotation with and axial movement on the intermediate shaft 12, and respective sets of outer plates 18L, 18R axially alternating with the inner plates 17L, 17R and splined to the inner peripheral wall surfaces of the drums 19L, 19R, respectively, for rotation with and axial movement in the drums 19L, 19R. The clutches 14L, 14R can be engaged when the plates 17L, 18L and the plates 17R, 18R are brought into frictional contact with each other by hydraulic pressures PL, PR introduced into the drums 19L, 19R, respectively, and acting on the plates 17L, 18L, 17R, 18R.

The spur gear mechanisms 15L, 15R comprise respective spur gears 20L, 20R fixed coaxially to the outer peripheral wall surfaces of the drums 19L, 19R, respectively, and respective spur gears 21L, 21R fixed coaxially to opposite outer peripheral wall surfaces of a differential case 22 of the differential 16. The spur gears 20L, 21L and the spur gears 20R, 21R are paired and mesh with each other as meshing means for transmitting drive power, which has been transmitted from the propeller shaft 11 to the intermediate shaft 12, to the differential 16.

The gear ratio between the meshing spur gears 20L, 21L and the gear ratio between the meshing spur gears 20R, 21R are different from each other. By engaging either one of the clutches 14L, 14R, therefore, the speed of rotation of the drive power to be transmitted to the differential 16 is varied depending on the gear ratio of the spur gears corresponding to the engaged clutch. Therefore, the spur gear mechanisms 15L, 15R and the clutches 14L, 14R jointly constitute transmissions.

The output shafts 23L, 23R of the differential 16 extend respectively from the opposite ends of the differential case 22 and are coupled to the drive road wheels. The differential 16 includes hydraulically operated multidisc clutches 24L, 24R disposed between the differential case 22 and the output shafts 23L, 23R.

The clutches 24L, 24R comprise respective sets of outer plates 25L, 25R mounted on lateral inner peripheral wall surfaces of the differential case 22 for rotation with and axial movement in the differential case 22, and respective sets of inner plates 26L, 26R axially alternating with the outer plates 25L, 25R and mounted on the output shafts 23L, 23R, respectively, for rotation with and axial movement on the output shafts 23L, 23R. When hydraulic pressures DL, DR are applied to the clutches 24L, 24R and act on the plates 25L, 26L, 25R, 26R, the plates 25L, 26L and the plates 25R, 26R are frictionally engaged, and transmit drive power commensurate with the applied hydraulic pressures to the output shafts 23L, 23R.

The hydraulic pressures DL, DR applied to the respective clutches 24L, 24R are independently controlled so that torques transmitted by the clutches 24L, 24R can individually be adjusted and the drive road wheels coupled to the output shafts 23L, 23R are allowed to rotate differentially.

The drive power transmission mechanism thus constructed operates as follows: The engine power from the transmission 10 is transmitted from the propeller shaft 11 through the bevel gear mechanism 13, the intermediate shaft 12, the clutches 14L, 14R, the spur gear mechanisms 15L, 15R, and the differential 16 to the drive road wheels (not shown). Differential rotation of the drive road wheels is allowed by the differential 16 by controlling the hydraulic pressures DL, DR applied to the clutches 24L, 24R of the differential 16, depending on a steering angle of the steering wheel of the motor vehicle or any of various other parameters. The clutches 14L, 14R are selectively engaged to select one of the spur gear mechanisms 15L, 15R, so that the speed of rotation of the transmitted drive power can be varied by the selected one of the spur gear mechanisms 15L, 15R. The transmissions constructed of the clutches 14L, 14R and the spur gear mechanisms 15L, 15R can be used as auxiliary transmissions.

The propeller shaft 11 and the intermediate shaft 12 are arranged such that their axes intersect with each other in one plane. The intermediate shaft 12 and the differential 16 may be arranged such that their axes extend parallel to each other or parallel to each other at different levels or heights in the vertical direction V of the motor vehicle, as shown in FIG. 2. Accordingly, the propeller shaft 11 and the intermediate shaft 12, and the intermediate shaft 12 and the differential 16 may be coupled by the ordinary bevel gear mechanisms 13A, 13B and the spur gear mechanisms 15L, 15R rather than hyperboloidal gears such as hypoid gears which require special lubricating oil. The drive power transmission mechanism of the present invention can therefore be manufactured inexpensively. Since no special lubricating oil is required, no special sealing structure is needed, and the structure of the drive power transmission mechanism is simple. The position of the propeller shaft 11 can be adjusted by adjusting the position of the intermediate shaft 12. Accordingly, the propeller shaft 11 can be positioned with greater freedom. The propeller shaft 11 can thus easily be positioned out of interference with a fuel tank and other parts, and allows the height of the bottom of the vehicle frame from the ground to be determined with greater freedom.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

I claim:

1. A drive power transmission mechanism in a motor vehicle having a drive power source, comprising:
   a propeller shaft having a front end coupled to the drive power source;
   a bevel gear mechanism;
   an intermediate shaft extending transversely to said propeller shaft and operatively coupled to a rear end of the propeller shaft through said bevel gear mechanism;
   a spur gear mechanism; and
   a final speed reducer operatively coupled to said intermediate shaft through said spur gear mechanism;
   wherein said final speed reducer comprises a differential including a pair of lateral coaxial output shafts extending parallel to said intermediate shaft and coupled to respective drive road wheels of the motor vehicle, a differential case disposed coaxially around said output shafts, a plurality of outer plates mounted on inner peripheral wall surfaces of said differential case for rotation with and axial movement on the differential case, a plurality of inner plates axially alternating with said outer plates and mounted on said output shafts for rotation with and axial movement on the output shafts, so that said output shafts can rotate differentially depending on a hydraulic pressure acting adjustably on said inner and outer plates, and wherein said spur gear mechanism comprises at least one spur gear set including a first spur gear disposed coaxially on said intermediate shaft and a second spur gear fixedly mounted coaxially on an outer peripheral wall surface of said differential case and meshing with said first spur gear at a predetermined gear ratio.

2. A drive power transmission mechanism according to claim 1, wherein said bevel gear mechanism comprises a first bevel gear fixed coaxially to the rear end of said propeller shaft and a second bevel gear fixedly mounted coaxially on said intermediate shaft and meshing with said first bevel gear at a predetermined gear ratio.

3. A drive power transmission mechanism according to claim 1, further including a hydraulically operated multidisc clutch mechanism including at least one clutch, said clutch comprising a drum mounted coaxially on said intermediate shaft, said first spur gear being fixedly mounted on an outer peripheral wall surface of said drum, a plurality of outer plates mounted on an inner peripheral wall surface of said drum for rotation with and axial movement on said drum, and a plurality of inner plates axially alternating with said outer plates of said drum and mounted on said intermediate shaft for rotation with and axial movement on said intermediate shaft, so that the drive power can be transmitted from said intermediate shaft to said differential at said predetermined gear ratio between said first and second spur gears depending on a hydraulic pressure adjustably acting on said inner and outer plates of the said clutch.

4. A drive power transmission mechanism according to claim 3, wherein said clutch mechanism includes first and second clutches mounted coaxially on laterally opposite portions of said intermediate shaft with said bevel gear mechanism located therebetween, a hydraulic pressure acting independently adjustably on the inner and outer plates of said first and second clutches, and wherein said spur gear mechanism includes first and second spur gear sets associated with said first and second clutches, respectively, and having different gear ratios, so that the drive power can be transmitted to said differential through a selected one of said first and second clutches and a corresponding one of said first and second spur gear sets.

5. A drive power transmission mechanism in a motor vehicle having a drive power source, comprising:
 a propeller shaft extending in a longitudinal direction of the motor vehicle and having a front end coupled to the drive power source;
 a differential having output shafts extending transversely of the motor vehicle and coupled to drive road wheels of the motor vehicle, said output shafts having respective axes disposed at a level different from the level of the axis of said propeller shaft in a vertical direction of the motor vehicle; and
 coupling means for transmitting the drive power from said propeller shaft to said differential, said coupling means comprising an intermediate shaft extending transversely to said propeller shaft, a first bevel gear fixed coaxially to a rear end of said propeller shaft, and a second bevel gear meshing with said first bevel gear and fixedly mounted coaxially on said intermediate shaft for receiving the drive power from said propeller shaft through said first bevel gear; and
 an auxiliary transmission including a clutch mechanism having at least one hydraulically operated multidisc clutch having a drum mounted coaxially on said intermediate shaft, a plurality of inner plates mounted on said intermediate shaft for rotation with and axial movement on said intermediate shaft, a plurality of outer plates axially alternating with said inner plates and mounted on an inner peripheral wall surface of said drum for rotation with and axial movement on said drum, and a spur gear mechanism including a pair of spur gears with a first spur gear fixedly mounted coaxially on an outer peripheral wall surface of said drum and a second spur gear fixedly mounted coaxially on a differential case of said differential which receives the drive power from the propeller shaft, said second spur gear being held in mesh with said first spur gear at a predetermined gear ratio, so that the drive power with the rotational speed thereof varied depending on said predetermined gear ratio can be transmitted to said differential.

6. A drive power transmission mechanism according to claim 5, wherein said clutch mechanism includes a plurality of hydraulically operated multidisc clutches, and said spur gear mechanism includes a plurality of said spur gear pairs associated with said clutches, respectively, and having different gear ratios, so that the drive power with the rotational speed thereof varied depending on a selected one of the gear ratios can be transmitted to said differential through a selected one of said clutches and a corresponding one of the spur gear pairs which has said selected one of the gear ratios.

* * * * *